United States Patent [19]

Tjaden

[11] 4,089,324
[45] May 16, 1978

[54] HEAT TRANSFER ELEMENT

[75] Inventor: Jan Tjaden, Durach, Germany

[73] Assignee: N.V. Internationale Octrooi Maatschappij "OCTROPA", Rotterdam, Netherlands

[21] Appl. No.: 680,278

[22] Filed: Apr. 26, 1976

[30] Foreign Application Priority Data

Apr. 26, 1975 Germany .............................. 2518683

[51] Int. Cl.² .............................................. F24J 3/02
[52] U.S. Cl. ..................................... 126/271; 165/76; 165/133; 165/170; 165/171; 165/DIG. 8; 428/184
[58] Field of Search ............... 126/270, 271; 237/1 A; 165/170, 76, 171, 133, 172, 173, 129, DIG. 8; 428/182, 184, 186

[56] References Cited

U.S. PATENT DOCUMENTS

| 2,763,586 | 9/1956 | Noyes | 428/182 |
| 2,970,077 | 1/1961 | Groves | 156/309 |
| 3,076,450 | 2/1963 | Gough et al. | 126/271 |
| 3,399,664 | 9/1968 | Suhay | 126/271 |
| 3,691,002 | 9/1972 | Blandy | 428/182 |
| 3,918,430 | 11/1975 | Stout et al. | 126/271 |
| 3,951,128 | 4/1976 | Schoenfelder | 126/271 |
| 3,957,109 | 5/1976 | Worthington | 237/1 A |
| 3,965,887 | 6/1976 | Gramer | 126/271 |

FOREIGN PATENT DOCUMENTS 962,409   6/1950   France .............................. 165/170

Primary Examiner—Kenneth W. Sprague
Assistant Examiner—James C. Yeung
Attorney, Agent, or Firm—Barry Kramer

[57] ABSTRACT

A heat transfer element having a plurality of parallel channels is formed from at least two interconnected metal foils or sheets, at least one of which is corrugated and at least one of which is flat, wherein the surfaces of the foils or sheets facing each other are coated with a weldable or sealable plastic or lacquer layer and are bonded to each other by means of these layers in their respective contact zones.

11 Claims, 14 Drawing Figures

Fig. 7.
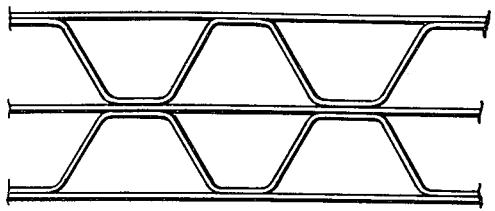
Fig. 8.
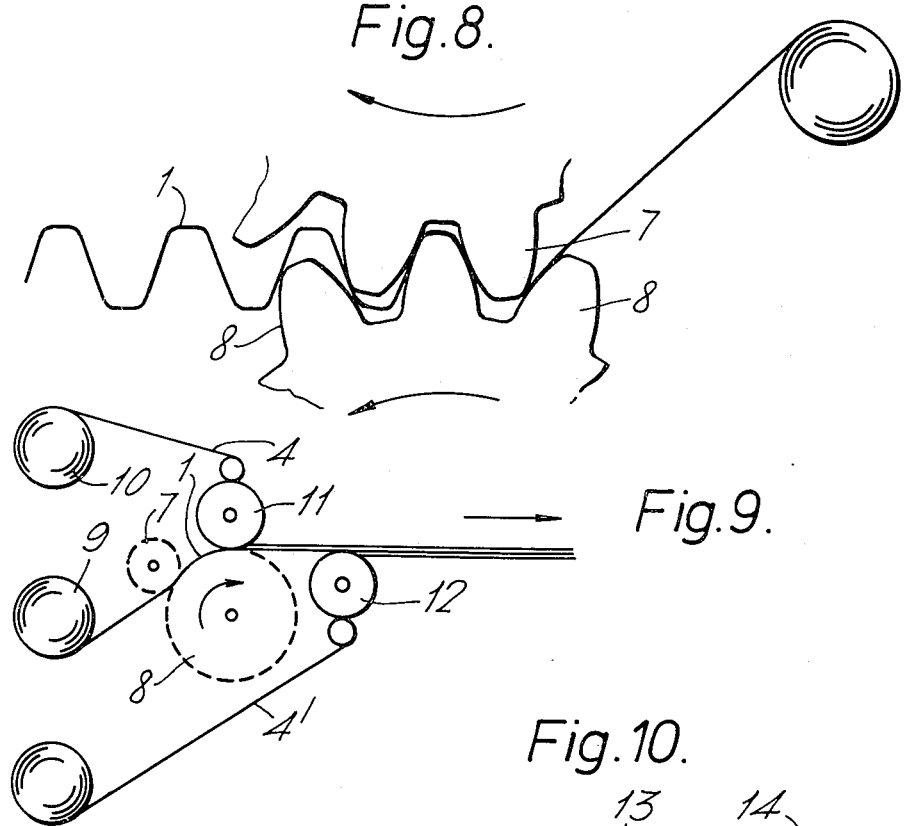
Fig. 9.
Fig. 10.
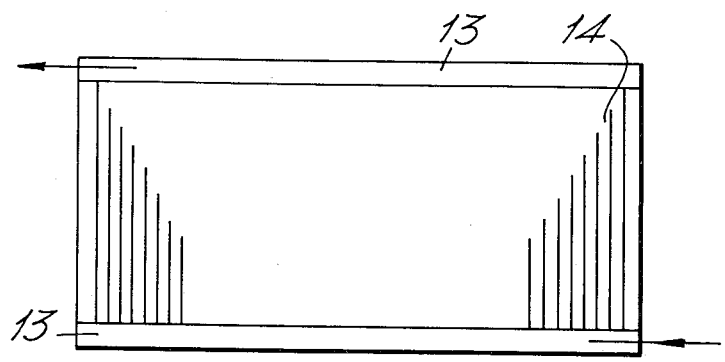

HEAT TRANSFER ELEMENT

The invention relates to a heat transfer element having at least two metal foils or sheets bonded together with formation of separate parallel channels, one of said foils or sheets being substantially flat and the other having a corrugated shape.

From U.S. Pat. No. 1,601,637 a heat transfer element is known in which a corrugated sheet is fixed to a flat sheet. In such a heat transfer element construction it is relatively difficult to achieve a close connection between the corrugated and the flat sheet. In general, up to now the two sheets have been joined in their mutual zones of contact by means of hard soldering or brazing. This has e.g. been described in German Patent Specification No. 2,048,010.

It is an object of the invention to arrange the flat and corrugated foils or metal sheets for a heat transfer element, to be joined with formation of channels, in such a way that the joining can be effected in a particularly simple manner. For this purpose the surfaces of the foils or sheets facing each other are coated with a layer of plastics material or a heat-sealing lacquer. The corrugated foil is given such a corrugated shape as to enable it to contact the flat foil or sheet over a certain width. In the contact zones of the two plastic or lacquer layers of the foils to be joined in each particular case are welded or sealed together by the application of heat and pressure.

The mouths of the channels of said heat transfer element open in a conventional way into hollow guides. According to a further embodiment of the invention these hollow guides are embedded in plastic foam material. The heat transfer element can be applied for several purposes, in so far as the sealed or welded joints between the flat and the corrugated foils or sheets will not dissolve as a result of the temperature prevailing in the element. A preferred use of the heat transfer element is in the collection of solar energy.

The outer surface of the heat transfer element can be treated in accordance with the purpose for which it is to be used. A surface facing the sun can for instance be provided with a dark coating of paint or lacquer, and it is also possible for the element to be provided with a transparent, ultraviolet light resistant foil covering the intermediate zones between the corrugations.

The invention will now be further illustrated with reference to the accompanying drawings in which FIG. 1 shows the basic element of a heat transfer element consisting of a flat foil and a corrugated foil;

FIGS. 3–7 show further embodiments of said heat transfer element, wherein one or several middle foils are coated on both sides with a sealable or weldable layer and several channels are arranged directly adjacent to each other;

FIG. 8 shows the shaping of the corrugations into a foil which was previously coated on one or both sides;

FIG. 9 shows the formation of a section consisting of three foils for a heat transfer element;

FIG. 10 is an example of a finished heat transfer element provided with distributing channels;

Figure 1:
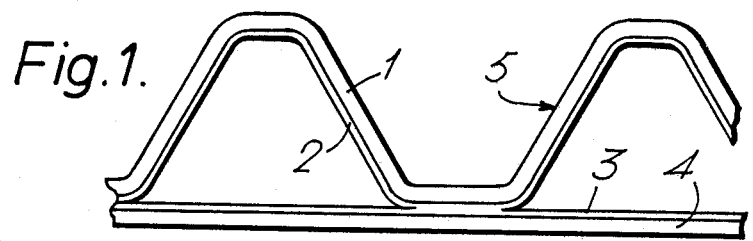

FIG. 1 is a front view of a basic element of the heat transfer element, consisting of a corrugated, thin aluminium foil 1, having a sealing layer 2 and welded in the contact zones to the sealing layer 3 of a smooth aluminium foil 4. The outer side of the corrugated foil may have a mat top surface, favouring the transfer of heat. This surface can also be provided with a dark painted coating layer 5 or the aluminium may have been anodized, if the heat transfer element is intended for use as a solar collector. The corrugated foil 1 is then heated by the solar radiation and emits the heat to a liquid which can flow in the channels formed by the corrugations between the foils 1 and 4.

The use of two metal foils or sheets coated with a plastic or heat-sealing lacquer layer enables the bonding of the foils or metal sheets in a very simple manner. It suffices, for instance, to press the two foils or metal sheets together in the contact zones by means of heated jaws, it then being required for the two plastic or lacquer layers to face each other.

Figure 2:
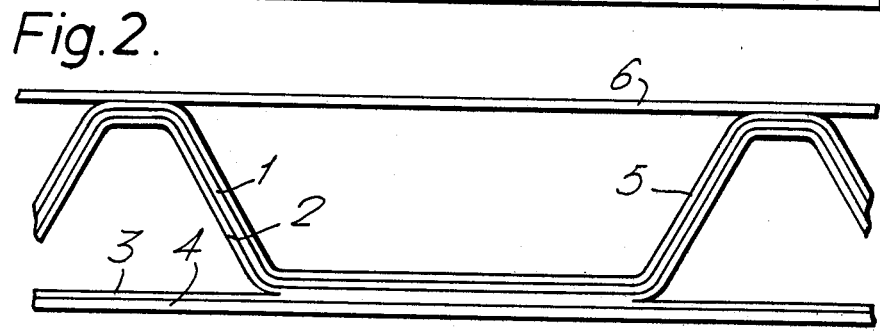
FIG. 2 shows a basic element provided with a covering foil, particularly suitable for the collection and transfer of solar energy.

In FIG. 2 it is shown how the basic element can be varied in order to obtain a specific embodiment of the heat transfer element, a collector for solar radiation. In the contact zones a corrugated, thin aluminium foil 1, having a sealing layer 2 on one side, is welded to the sealing layer 3 of a smooth aluminium foil 4. The other side of the corrugated foil 1 is provided with a dark painted, sealable coating 5. This side of the corrugated aluminium foil 1 is connected with a transparent, ultraviolet-resistant covering foil 6 by bonding of the contact surfaces. Instead of sealing, it is also possible to glue the contacting surfaces together. In this way, air-filled channels are formed in which the reflected radiation is better utilized in the form of the hot-house effect, to improve the efficiency of the collector. The optimum angle of erection for a solar collector is 70° in winter and 40° in summer towards the South (geographical latitude of Kempten, Allgäu, Germany). If for optical reasons the inclined position of the element should be undesirable, compensation can be obtained by a corresponding shaping of the corrugated foil. If, for instance, the corrugations have a flank angle of 70° towards the South, the collector can be laid flat without causing any substantial loss. This flat position indeed implies that one flank is not exposed to solar radiation but this is compensated by the fact that the distance between two corrugations is greater than in the basic element. If the surface between the corrugation crests absorbs radiation, heat transfer from this surface to the flank of the corrugation also heats the side facing away from the sun, of the channel formed between the aluminium foils. Thus an optimum heat output is obtained.

FIGS. 3–7 show some possibilities of combining corrugated and flat foils or metal sheets with one or more further corrugated or flat foils or metal sheets. It is also possible to substitute the collector element shown in FIG. 2 for the basic element shown in FIG. 1.

Figure 3:
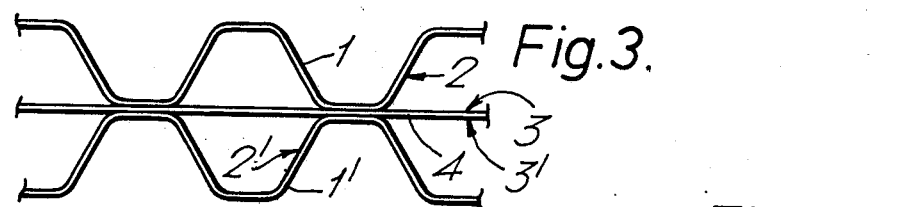

FIG. 3 shows an embodiment of the heat transfer element, consisting of bonding a corrugated aluminium foil 1, provided on one side with a sealing layer 2, to a flat aluminium foil 4, having a sealing layer 3 and 3' on both sides. The two foils are welded together in their zones of contact. Additionally, a second, also corrugated aluminium foil 1', having a sealing layer 2' on one side, is welded to the other side of the smooth aluminium foil 4, opposite to the corrugated foil 1.

Figure 4:
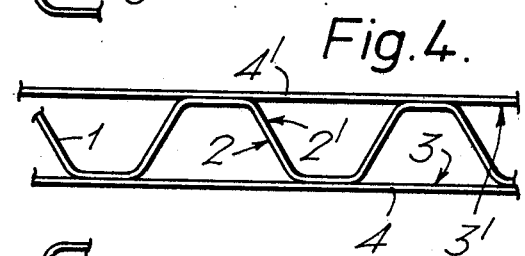

FIG. 4 shows a further embodiment of the heat transfer element. In this embodiment a corrugated aluminium foil 1, coated on both sides with a sealing layer 2 and 2', is welded in the contact zones to a smooth aluminium foil 4, having a sealing layer 3 on one side. The other side of the corrugated foil 1 is, in its contact zones, welded to the sealing layer 3' of a second smooth aluminium foil 4'.

In this embodiment as well as in the further embodiments to be described below, the same medium or different media can flow in the adjacent channels thus formed.

Figure 5:
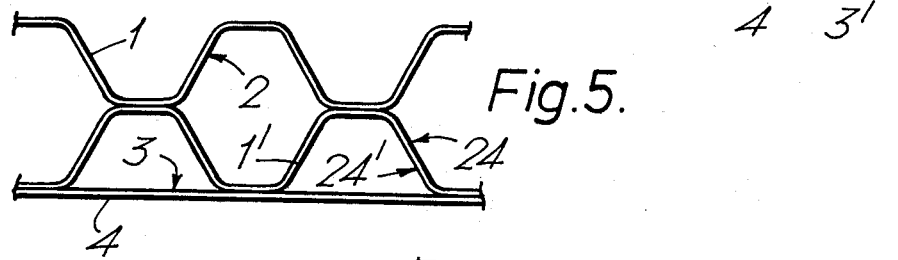

FIG. 5 shows a further possibility of varying the heat transfer element. A corrugated aluminium foil 1, having a sealing layer 2 on one side, is bonded in the contact zones to a second corrugated aluminium foil 1', having a sealing layer 24 and 24' on both sides, by welding. The other side of this second corrugated aluminium foil 1' is welded in the contact zones to sealing layer 3 on one side of a smooth aluminium foil 4.

Figure 6:
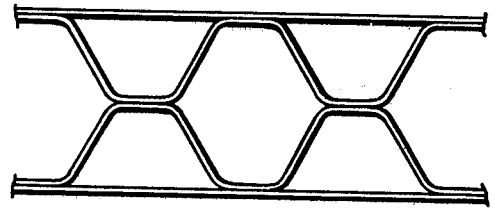

FIG. 6 shows a further variation of the heat transfer element, wherein the aluminium foils are welded together in the arrangement flat/corrugated/corrugated/flat foil.

FIG. 7 shows the combination as in FIG. 6, in which however a flat foil is additionally provided between the two corrugated foils.

A preferred material for the elements of the heat transfer element is aluminium, to which at least on one side a weldable plastic material, which is heat-resistant in the contemplated temperature range, preferably polypropylene, has been applied.

If aluminium is used, the two foils or sheets to be applied can be very thin foils/sheets. This material and the slight degree of thickness thereof then results in a very good heat transfer, both on welding together of the foils and on using the heat transfer element. A sufficient strength of the members of the heat transfer element is achieved by combining flat and corrugated foils or metal sheets 1 and 4 and by joining them in their contact zones by sealing or welding of the plastic or lacquer layers 2 and 3.

Depending on the size of the elements and the form of the corrugations as well as on their contemplated use, aluminium foils having a thickness of 0.1 to 0.3 mm can be used. For solar collectors manufactured by way of experiment, foils of 0.11 mm and 0.2 mm thickness were successfully used. When aluminium foils having a thickness of 0.3 mm were used, which in principle is possible, it took a relatively long time for the plastic layer to reach a temperature required for welding.

In addition to polypropylene, the following suitable plastic materials can be considered for the layers 2 and 3: polyethylene, polyester, polycarbonate, polyvinylidene fluoride, polyvinyl fluoride and polysulphone. In the case of polyethylene the temperature of the medium in the channels should not exceed 60° C. In the case of solar collectors a working temperature of up to 70° C is taken into account, which if desired can be maintained by increasing the amount of water passing through. For this purpose both polypropylene and polycarbonate are suitable, since they allow a temperature of up to 80° C. Coating with polysulphone results in a heat transfer element with a flow medium that may have a temperature of up to 120° C. The thickness of the plastic layer in experiments carried out by the Applicant amounted to 0.05 mm. Layers of up to 0.075 mm thickness can be advantageous.

The heat-sealing lacquers to be used can by synthetic resin lacquers, in which case also temperatures of 100° C and even up to about 160° C in the medium do not adversely affect the strength of the sealing joints.

Dependent on the materials used, the heat transfer element can also be adjusted at temperatures of the medium of 100° C to −40° C.

FIG. 10 shows the connection of the heat transfer element with a distributing channel. The axial ends of the elements are each mounted in a hollow guide 13. This hollow guide serves as distributing channel for the heat transfer agent. A liquid or a gas flows via these hollow guides into the channels 14 formed between the two aluminium foils. This results in a uniform distribution of the heat-transferring medium over all the channels of an element. The two hollow guides simultaneously serve to strengthen the heat transfer element transversely to the longitudinal direction of the channels.

Figure 11:
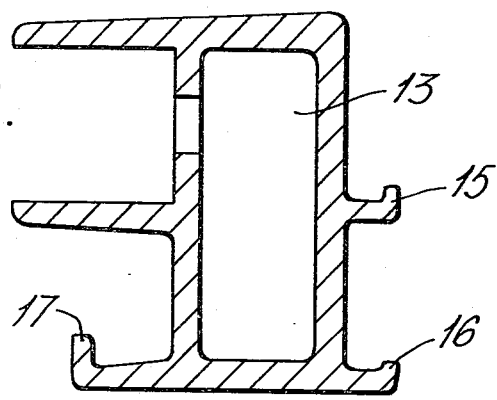
FIG. 11 shows a hollow guide used as a distributing channel.

FIG. 11 represents an embodiment of the hollow guide shown in FIG. 10. This distributing channel can be made of aluminium or plastic material. It should not merely transport and distribute the heat transfer medium but also contributes to strengthening the constructional element. The profile of the hollow guide is provided with several projections 15, 16, 17, with which the element is supported in a foam material. Besides the hollow guide, also the element consisting of corrugated and flat foils can be completely or at least partly be supported on foam material, particularly on that side of the element that is not required for the transfer of heat.

As foam material, in the case of the temperatures of up to 60° C a polystyrene foam can be used; at higher temperatures a foam from polyurethane or a similar plastic material is suitable.

Figure 12:
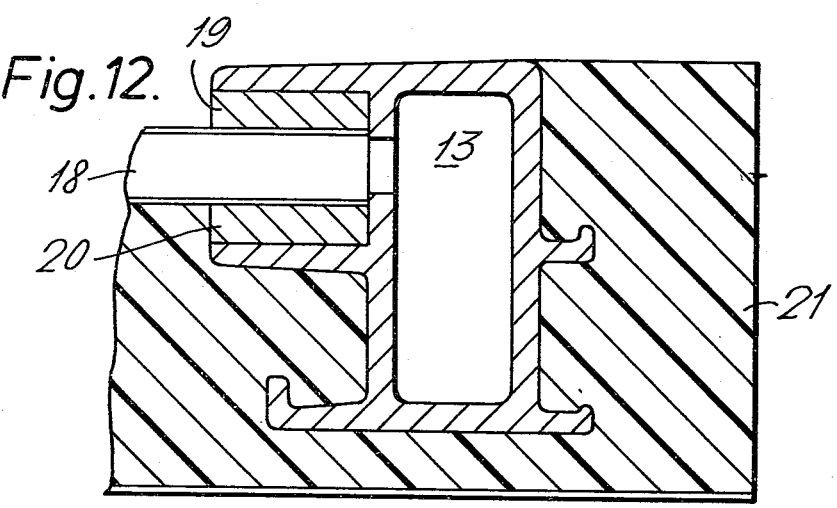
FIG. 12 shows the connection between hollow guide and basic element of the heat transfer element and its embedding in foam material.

FIG. 12 shows a possibility of sealing the basic element of the heat transfer element 18 against the distributing channel, with the corrugation outwards. This sealing consists of two soft profiles, a corrugated profile 19 on the outside and a flat profile 20. On mounting, the aluminium section 18 is inserted, together with the corresponding sealing sections 19 and 20, into the groove of the distributor profile 13. The complete heat transfer element is embedded in foam material 21 for stiffening and heat isolation purposes.

Figure 13:
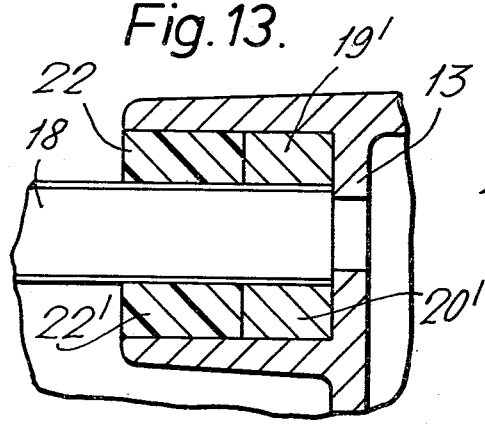
FIGS. 13 and 14 shows alternative arrangements for the joining of the members of heat transfer elements with a hollow guide as the distributing channel.

FIG. 13 shows a further possibility of sealing the basic element of the heat transfer element 18 against the distributing channel 13. In this case two sealing profiles 19' and 20' are used which are of a somewhat narrower type than shown in FIG. 12. With these sealing profiles the aluminium section 18 is centered in the groove and in addition this arrangement prevents the sealing mass inserted afterwards from penetrating into the distributing channel. The sealing is then effected by filling up with silicone rubber or another suitable sealing mass 22 and 22'.

Figure 14:
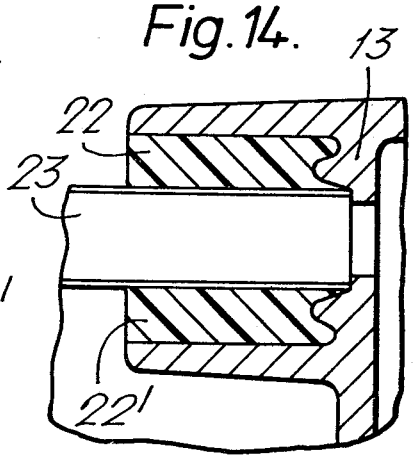

FIG. 14 shows how an element 23 having a flat/corrugated/flat construction can be sealed against the distributing channel 13. In this arrangement a shoulder in the profile of the distributing channel effects centering of the heat exchange element 23 during the filling up with sealing mass 22 and 22'.

FIG. 8 shows the formation of the corrugated coated or lacquered aluminium foil 1 between the teeth of a pair of toothed wheels 7 and 8. By a corresponding shaping of the moulding tools any desired profile can be obtained.

FIG. 9 illustrates the manufacturing of a heat transfer element. The most essential part of the apparatus is the forming station consisting of two toothed cyliners 7 and 8. The forming station draws the coated aluminium foil from a roll 9 and forms the corrugated aluminium foil 1. From a second roll 10 the smooth layer of coated aluminium foil is unrolled at a corresponding speed, heated around the periphery of the laminating cylinder 11 and, during rolling on the large toothed cylinder 8, bonded to the corrugated foil. The bond can even be improved by also heating the large toothed cylinder 8.

If a second smooth covering layer is desired, e.g. for an element according to FIG. 4, said layer can again be supplied over a heated laminating cylinder 12. For this purpose it will be required to install a counter-cylinder opposite cylinder 12 for taking up the welding pressure and, if desired, to heat the corrugation, e.g. by means of gas flames (not shown).

I claim:

1. A heat transfer element comprising:
   a. at least one flat metal sheet coated with a weldable layer of plastic material;
   b. at least one corrugated metal sheet coated with said weldable layer of plastic material, the plastic surfaces of said corrugated sheet and said flat sheet being bonded together in mutual contact zones forming parallel channels, said channels being open at both ends; and
   c. a pair of hollow distributing channels, each said distributing channel adapted to receive one of said parallel channel ends therein for permitting fluid communication between said parallel channel and said distributing channel.

2. A heat transfer element according to claim 1 wherein said metal sheets consist of aluminum having a thickness of 0.100 to 0.300 mm.

3. A heat transfer element according to claim 2, wherein the plastic material is polypropylene having a layer thickness of 0.05 to 0.075 mm.

4. A heat transfer element according to claim 2, wherein the plastic material selected from the group consisting of is polyester, polycarbonate, polyvinylfluoride, polyvinylidene fluoride or polysulphone with a layer thickness of 0.05 to 0.075.

5. A heat transfer element according to claim 1, wherein at least one corrugated sheet is provided with a mat outer surface.

6. A heat transfer element according to claim 1, wherein at least one corrugated sheet is provided with a dark outer surface.

7. A heat transfer element according to claim 1 wherein the width of the contact surface between said corrugated sheet and flat sheet exceeds the width of the channel on the flat sheet.

8. A heat transfer element according to claim 1, consisting of a flat sheet and a corrugated sheet applied to both sides of the flat sheet, wherein the contact surfaces of the corrugated sheets face the contact zones of the flat sheet in the same direction.

9. A heat transfer element according to claim 1, consisting of a corrugated sheet and two flat sheets applied to both sides of the corrugated sheet.

10. A heat transfer element according to claim 1, consisting of two corrugated sheets, the corrugations of which are parallel to each other, and a flat sheet.

11. A heat transfer element according to claim 1, wherein the distributing channels formed by hollow guides at the ends of the channels formed by the corrugated sheets, as well as at least part of one side of the element formed by the corrugated and flat sheets are embedded in plastic foam material.

* * * * *